United States Patent [19]

Takada

[11] 4,367,887
[45] Jan. 11, 1983

[54] AUTOMATIC PASSIVE SAFETY SEAT BELT SYSTEM FOR A VEHICLE

[76] Inventor: Juichiro Takada, 3-12-1 Shinmachi, Setagayaku, Tokyo, Japan

[21] Appl. No.: 210,257

[22] Filed: Nov. 25, 1980

[30] Foreign Application Priority Data

Nov. 30, 1979 [JP] Japan .......................... 54-164949[U]

[51] Int. Cl.³ .......................................... B60R 21/00
[52] U.S. Cl. .................................. 280/803; 310/148; 318/292
[58] Field of Search ............... 280/803, 804; 318/292, 318/311; 310/148, 149

[56] References Cited

U.S. PATENT DOCUMENTS 3,310,722 3/1967 Diello ................................. 310/148
4,281,853 8/1981 LeVeux ............................. 280/804

Primary Examiner—Joseph F. Peters, Jr.
Assistant Examiner—John A. Carroll
Attorney, Agent, or Firm—Brumbaugh, Graves, Donohue & Raymond

[57] ABSTRACT

A passive safety seat belt system for a vehicle includes a belt that is driven between a restraint position and a release position by a direct current electric motor having first and second brushes positioned diametrically opposite each other on the commutator. A third brush is positioned adjacent the second brush and contacts the commutator. When the first and second brushes are connected to a source of current to energize the motor, the motor produces a first torque output in a forward direction, and when the first and third brushes are connected with a source of current to energize the motor, the motor produces a second torque smaller than the first torque and in a reverse direction. The motor operates in the forward direction to drive the belt system from the release position to the restraint position in one time period, and operates in the reverse direction to drive the belt system from the restraint position to the release position in approximately the same time period.

1 Claim, 6 Drawing Figures

AUTOMATIC PASSIVE SAFETY SEAT BELT SYSTEM FOR A VEHICLE

BACKGROUND OF THE INVENTION

1. Field of the Invention

This invention relates to safety belts, and more particularly, to passive restraint safety belts in a vehicle using a variable torque direct current motor for transferring the belt between the restraint and release configurations.

2. Description of the Prior Art

Passive safety belt systems generally have one or more retractors connected to the belt to adjust the length of the belt between the release and the restraint positions. In the restraint position, the belt must be variably withdrawn from or retracted in the retractors so as to accommodate comfortably the passenger's seating position. Further, in an emergency situation, the belt must not be able to be withdrawn so as to restrain the passenger.

In most retractors, a spring drives a belt reel to rewind the belt and augments the power of the belt transfer drive in moving the belt to the restraint configuration. When the belt is unwound, some power is required to load the spring. Therefore, in a belt system in which a D.C. motor is used to drive the transfer belt between the release and restraint positions, the belt transfer time from the restraint position to the release position takes longer than the opposite direction because of the different power outputs required in forward and reverse.

The time difference is often disconcerting to the vehicle passengers. The elimination of this time difference is, of course, desirable. The prior art includes two ways of dealing with this time difference. In one method, a resistance is inserted in series with the D.C. motor circuit during the transfer from release to restraint to decrease the torque of the motor to equalize the transfer time duration. In the second method, an auxiliary spring is inserted into the output shaft section of the D.C. motor and stores energy during the time of transfer from release to restraint. The accumulated energy is added to the motor output when the belt is transferred from the restraint to the release position. This provides equalization of the transfer times. In the resistance type, a great amount of heat is generated by the resistance element during the transfer time from release to restraint, thereby restricting the choice of mounting places for the resistance element. The resistance requires space, is somewhat complicated, and the power loss from the resistance shortens the life of the vehicle battery.

The auxiliary spring is generally located along with the motor inside the vehicle door. However, the space within the door is often too small to accommodate it. Moreover, the spring often has poor reliability, and fails before 100 thousand repetitions. It is also difficult to determine the proper number of turns in the spring. The above and other problems are important disadvantages that diminish the practical commercial value of known devices.

The present invention overcomes these and other problems by a variable torque D.C. motor that produces different torques in the two transfer modes (forward and reverse) to equalize the transfer times.

SUMMARY OF THE INVENTION

In accordance with the present invention, a third rectifying brush is added to the usual two rectifying brushes of a D.C. motor. The third brush is used in conjunction with either of the two rectifying brushes to obtain selectively a higher torque output and a lower torque output from the D.C. motor.

BRIEF DESCRIPTION OF THE DRAWINGS

A more complete understanding of the invention and its advantages will be apparent from the following Detailed Description taken in conjunction with the accompanying drawings, in which.

DETAILED DESCRIPTION

Figure 1:
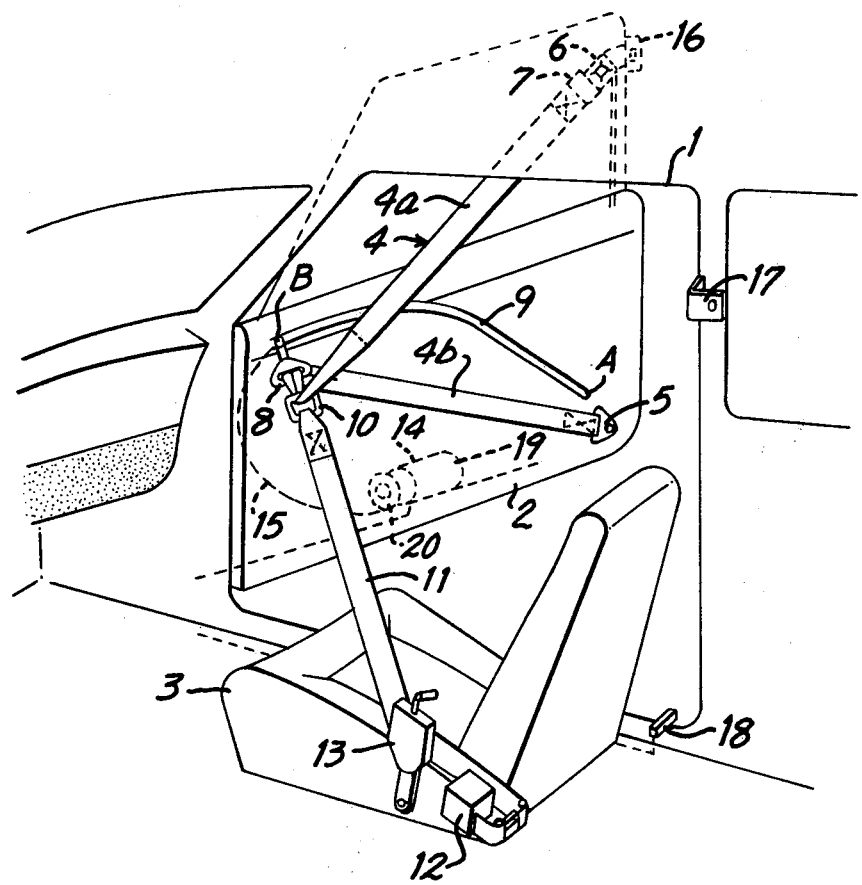
FIG. 1 shows the interior of an automobile with one embodiment of a passive type safety seat belt system in accord with the present invention.

FIG. 1 shows an exemplary embodiment of the present invention, wherein the numeral 1 refers to a vehicle body, 2 a door, 3 a seat, and 4 a continuous belt composed of a shoulder belt portion 4a and a lap belt portion 4b. The lower end of the belt 4 is attached to an anchor 5 secured near the lower, rear corner of the door 2. The upper end of the belt 4 is attached to the upper rear corner of the door 2 by a tongue 7 that is received by an emergency release buckle 6 fastened to the door so that the belt 4 can be released in an emergency.

A guide ring 8 attaches the belt 4 to a suitable slide received in a guide rail 9 attached to the door. A driving mechanism 14, which consists of a D.C. motor 19 and a gear train 20 and which is actuated by a door switch 18 responsive to the opening and closing of the door, drives a racked wire 15 that is connected to the slide. As the ring 8 slides along the guide rail 9, the belt 4 moves between the release and the restraint positions.

A control belt 11 is attached to the restraint belt 4 by a D-ring 10 and extends through a belt guide 13 attached to the inboard side of the seat 3 from an emergency locking retractor 12. The belt 4 can freely be withdrawn from or retracted into the retractor 12, except when it locks in an emergency. A reinforcing plate 16 is attached to the door frame and mates with a lug 17 attached to the center post to strengthen the attachment of the belt 4 to the vehicle.

In an alternate embodiment not illustrated in the drawings, the guide rail can be positioned in the roof of the vehicle above the door. As is known to those skilled in the art, a shoulder belt leading from an inboard retractor may be used in lieu of the illustrated three point belt with the guide rail in the roof above the door. The shoulder belt can be used with a moving-anchor system with the outboard end of the belt moving along the guide rail in such an embodiment, or the outboard end of the shoulder belt can be fastened to the roof above and behind the occupant and pass freely through a transfer ring that moves along the guide rail.

Figure 2:
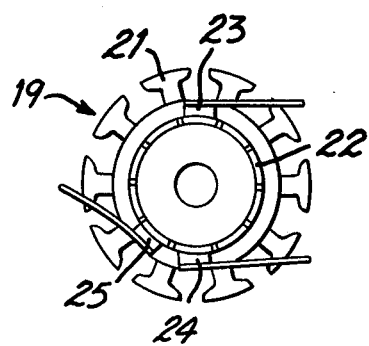
FIG. 2 shows a schematic cross-section of a D.C. motor used in accord with the present invention.

Referring to FIG. 2, the motor 19 is a series wound D.C. motor, and includes a first rectifying brush 23 and second rectifying brush 24 located diametrically opposite each other and a third brush located adjacent the second brush. All of the brushes are, of course, in sliding engagement with a commutator 22 of the rotor 21.

Figure 3:
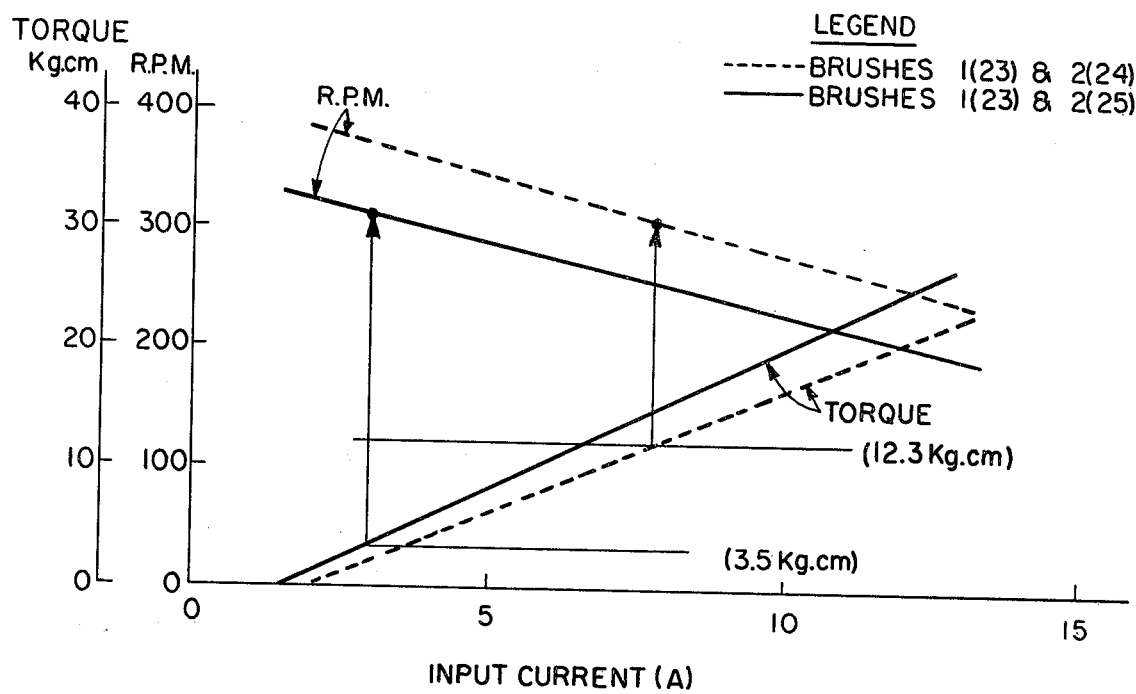
FIG. 3 is a graphical depiction of the characteristic curves of a D.C. motor in accord with the present invention.
Figure 3A:
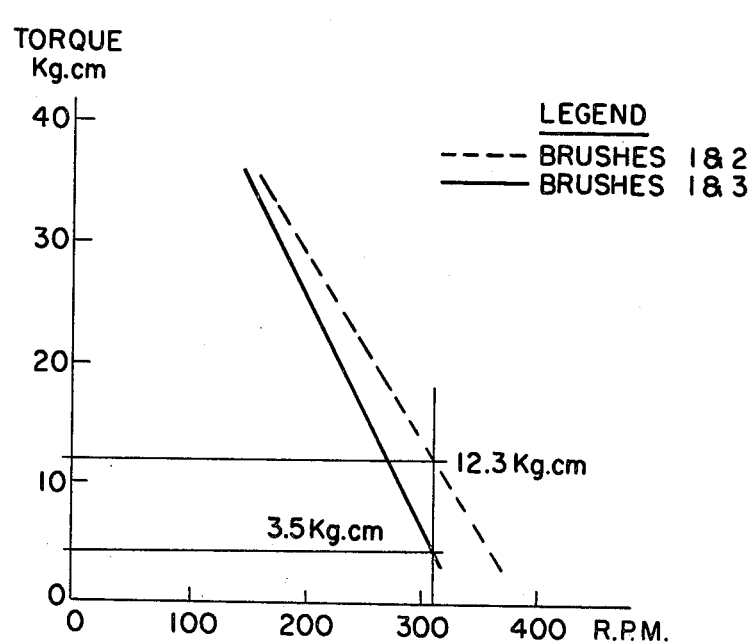
FIG. 3A graphically illustrates the relationship between output torque and revolutions per minute of a D.C. motor in accord with the present invention.

The power output from the motor when the first brush 23 and second brush 24 provide the current input differs from the power output when the first brush 23 and the third brush 25 provide the current input, as evidenced by the characteristic curves in FIG. 3. In the figures, the curve representing the input current with first and second brushes 23, 24 is illustrated with a dotted line. The curve representing the input current with first and third brushes 23, 25 is illustrated with a solid line. FIG. 3 shows the relation between input current in amperes to the output torque is (Kg.cm) and R.P.M. (revolutions per minute). As illustrated in the FIG. 3, the torque is significantly greater with first and second brushes 23, 24 than with first and third brushes 23 and 25.

In the passive seat belt system of the present invention, the D.C. motor runs automatically in response to the opening and closing of the door to move the belt between the restraint position (A) and the release position (B). Two embodiments of electric circuits for accomplishing the operation are illustrated in FIGS. 4 and 5.

Figure 4:
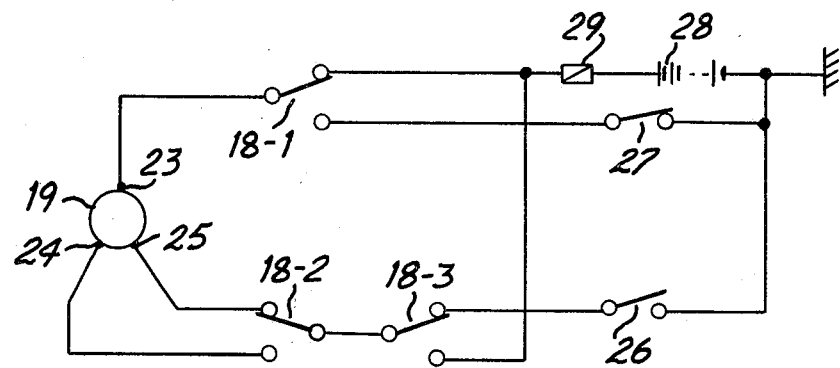
FIG. 4 and FIG. 5 illustrate electrical circuits in accord with the present invention.
Figure 5:
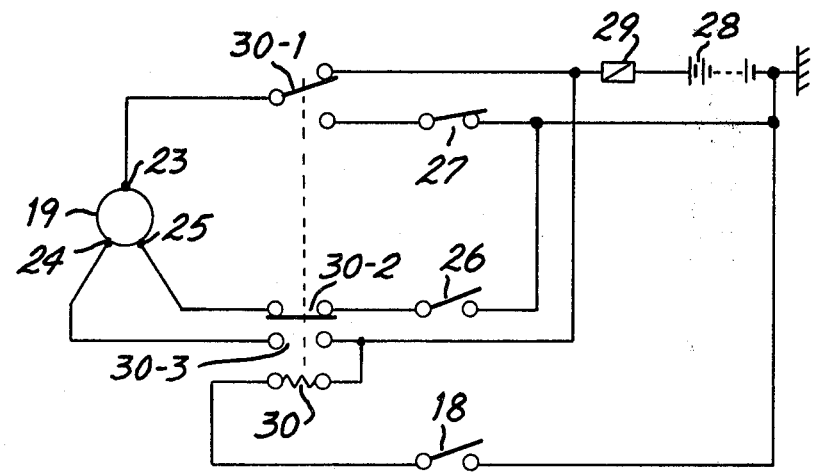

In FIG. 4, the electric circuit includes the D.C. motor 19 with the brushes 23, 24 and 25. A triple pole, triple throw door switch 18 has switches 18-1, 18-2 and 18-3. A limit switch 26 opens the circuit when the belt 4 is in the restraint position (A), and is closed at all other times. The circuit includes the vehicle battery 28 and a protective fuse 29.

In the illustrated embodiment, the door 2 is closed and the belt 4 is in the restraint position (A). The D.C. motor 19 is supplied with input current through first brush 23 and third brush 25. The upper throw contacts of switches 18-1, 18-2, 18-3 in FIG. 4 are closed, and the limit switch 26 is closed. In the illustrated circuit, the motor 19 will operate in the usual, forward direction of rotation.

In the opposite rotational direction, the motor is supplied with input power through the first brush 23 and the second brush 24. The switches 18-1, 18-2, 18-3 are in the lower throw positions of FIG. 4. A release-detecting limit switch 27 is closed. In the reverse direction case, the fuse 29 and the battery 28 have inverse polarity with respect to the forward direction case.

The operation of the circuit of FIG. 4 is as follows:

Beginning with the door open and the belt system in the release configuration, the passenger enters the vehicle and closes the door. The closing of the door transfers the switches 18-1, 18-2, and 18-3 to the upper throw positions (as shown in FIG. 4) to energize the motor 19. The motor operates in a forward direction to move the guide ring 8 along the rail 9 toward the lower rear corner of the door 2. At the same time, the control belt 11 is wound into the retractor 12 and the passenger is restrained by the should belt 4a and lap belt 4b. As the retractor 12 is operated, the torque is approximately 3.5 Kg.cm, as shown in FIG. 3. The motor 19 runs in the forward direction with r.p.m. $n_1$ corresponding to a low torque driving force. When the ring 8 and the belt 4 reach the restraint position (A), the restraint detection limit switch 26 is actuated to open the circuit and stop the motor 19.

When the passenger opens the door 2 to get out, contacts 18-1, 18-2, and 18-3 are transferred to the lower position. The first and second brushes 23, 24 of the motor 19 are energized to move the guide ring 8 from restraint position (A) to release position (B). At the same time, the control belt 11 is withdrawn from the retractor 12. When the belt 4 is in the release position, the release-detecting limit switch 27 is transferred to turn off the motor 19. It should be noted that the circuit has inverse polarity as compared to the case where the passenger is seated, so the D.C. motor 19 operates in the opposite direction.

The belt moves from the restraint position (A) to the release position (B) after the door is opened while the passenger remains seated on the seat 3. In this case, the retracting spring of the retractor 12 adds its retracting force to increase the load on the motor 19. Thus, when the control belt is pulled out to the release configuration, the torque output becomes very nearly 12.3 Kg.cm, as depicted in the curve in FIG. 3.

When the third brush 25 is positioned adjacent the second brush 24 on the commutator 22, the motor 19 produces the torque and r.p.m. curves illustrated in FIG. 3 by the solid lines. By changing the position of the third brush, the relationship between forward and reverse power output can be varied to meet the needs for a particular restraint belt system.

With reference to FIG. 5, another electrical circuit embodying the present invention is illustrated. The circuit includes a single pole, single throw type door switch 18 that is connected in series with a relay having a switching contact 30-1, ordinarily closed contacts 30-2 and ordinarily open contacts 30-3. The relay 30 operates in a similar fashion as the triple pole, triple throw switch 18 in FIG. 4. The remaining elements of the circuit in FIG. 5 correspond to the elements in FIG. 4, and will not be further described.

As detailed above, the two brush, D,C, motor 19 with a third brush supplies two variable outputs. The external, physical size of the motor is the same as a general purpose electric motor, i.e., smaller than motors with an external resistance or an auxiliary spring.

The motor 19 can be mounted almost anywhere inside a door. The required modifications to a conventional D.C. motor are not costly, and the motor can be readily produced on existing conventional assembly lines. Further, the motor can be made very strong to withstand high acceleration. A system provided with the invention is very reliable, and the electrical circuit controlling the motor is economical to produce.

While more than one embodiment of the present invention has been described in detail herein and shown in the accompanying drawings, it will be evident that various further modifications are possible without departing from spirit and scope of the invention.

I claim:

1. A passive safety seat belt system for a vehicle having a restraint position wherein the passenger of the vehicle is restrained from movement within the vehicle and a release position wherein the passenger is not restrained from movement, the door of the vehicle being closed in the restraint position and open in the release position, comprising:
    a direct current electric motor with first and second brushes positioned diametrically opposed on the commutator;
    a third brush positioned adjacent said second brush and contacting the commutator;
    means for connecting said first and second brushes only with a source of current to energize said motor such that it produces a first torque output in a forward direction to transfer the belt system from the restraint position to the release position; and means for connecting said first and third brushes only with a source of current to energize said motor such that it produces second torque smaller than said first torque and in a reverse direction to transfer the belt system from the release position to the restraint position;

whereby the time for transfer of the belt system from the release position to the restraint position is substantially equal to the time for transfer from the restraint position to the release position.

* * * * *